United States Patent
Erdl

(10) Patent No.: US 7,441,932 B2
(45) Date of Patent: Oct. 28, 2008

(54) VEHICLE HEADLIGHT

(75) Inventor: Helmut Erdl, Vogtareuth (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/802,900

(22) Filed: May 25, 2007

(65) Prior Publication Data

US 2008/0002418 A1    Jan. 3, 2008

Related U.S. Application Data

(63) Continuation of application No. PCT/EP2005/010037, filed on Sep. 17, 2005.

(30) Foreign Application Priority Data

Nov. 26, 2004    (DE) .................. 10 2004 057 131

(51) Int. Cl.
*F21V 9/00* (2006.01)
(52) U.S. Cl. .................. 362/511; 362/507; 362/517
(58) Field of Classification Search .................. 362/507, 362/516–518, 511, 538
See application file for complete search history.

(56) References Cited

U.S. PATENT DOCUMENTS

| | | | |
|---|---|---|---|
| 5,574,328 A | 11/1996 | Okuchi | |
| 5,918,973 A * | 7/1999 | Nojiri | .................. 362/511 |
| 6,107,916 A | 8/2000 | Beck et al. | |
| 6,174,079 B1 * | 1/2001 | Buard | .................. 362/511 |
| 6,499,864 B2 | 12/2002 | Luce | |
| 2006/0227568 A1 | 10/2006 | Enders et al. | |
| 2007/0115677 A1 * | 5/2007 | Faghihzadeh | .................. 362/511 |

FOREIGN PATENT DOCUMENTS

| | | |
|---|---|---|
| DE | 197 37 653 A1 | 3/1999 |
| DE | 100 40 302 A1 | 2/2002 |
| DE | 101 15 868 A1 | 10/2002 |
| DE | 102 18 437 A1 | 1/2004 |
| EP | 0 501 669 B1 | 11/1995 |

(Continued)

OTHER PUBLICATIONS

International Search Report dated Dec. 6, 2005 with English translation (Six (6) pages).

(Continued)

*Primary Examiner*—Ali Alavi
(74) *Attorney, Agent, or Firm*—Crowell & Moring LLP

(57) ABSTRACT

A headlight includes a system for illumination of dual parking lights on a motor vehicle using a single light source positioned in front of a headlight reflector. The reflector has one surface section that reflects light to an optical waveguide in the front, and around the circular edge, of the reflector that serves as the parking light of the headlight, and another surface section that reflects light to a planar mirror reflector located in front of the light source and reflector, at an inclined angle to the main beam's optical axis. An optical waveguide element is attached to the reflector's surface extending behind the reflector in a direction opposite to that of the main beam direction. The planar mirror reflector focuses received light to a focal point at the entrance of the optical waveguide element, which couples the light to a neighboring optical waveguide associated with a neighboring headlight.

16 Claims, 2 Drawing Sheets

FOREIGN PATENT DOCUMENTS

| | | |
|---|---|---|
| EP | 0 900 694 A2 | 10/1999 |
| EP | 1 152 188 A2 | 11/2001 |
| EP | 1 557 605 A2 | 11/2004 |
| WO | WO 99/11968 A1 | 3/1999 |
| WO | WO 2005/039924 A1 | 5/2005 |

OTHER PUBLICATIONS

German Search Report dated May 25, 2005 with English translation (Eight (8) Pages).

* cited by examiner

VEHICLE HEADLIGHT

CROSS-REFERENCE TO RELATED APPLICATIONS

This application is a continuation of PCT International Application No. PCT/EP2005/010037, filed Sep. 17, 2005, which claims priority under 35 U.S.C. § 119 to German Patent Application No. 10 2004 057 131.7 filed Nov. 26, 2004, the entire disclosures of which are herein expressly incorporated by reference.

BACKGROUND AND SUMMARY OF THE INVENTION

The invention relates to a headlight for a motor vehicle.

Vehicle headlights are known, for example, from European Patent Document EP 0 900 694 A2 and from German Patent Document DE 100 40 302 A1, which conventionally have a reflector with a light source arranged at the reflector's focal point. An approximately ring-shaped optical waveguide constructed as a long rigid and stretched-out light output element, is disposed at the front edge of the reflector in the main beam radiation direction. From German Patent Document DE 100 40 302 A1, it is known to assign a second optical waveguide and a second light output element, respectively, to a neighboring vehicle headlight. The optical waveguides and light output elements are illuminated by a light source separate from the light source arranged at the reflector's focal point.

A disadvantage of these known types of headlights is that if the light source assigned to the reflector is a gas discharge lamp used, for example, as a daytime driving light, and the light source assigned to the optical waveguide is a light bulb used, for example, as a position or parking light, the color of the daytime driving light differs from the color of the position or parking light.

Another disadvantage is that due to the additional separate light source and use of the known relatively long rigid optical waveguides, the construction of the headlight assembly requires relatively high expenditures and costs and is susceptible to damage caused by the assembly.

A headlight is also known from German Patent Document DE 101 15 868 A1 that has a reflector and a light source for generating a low beam, as well as an optical waveguide element into which light from the light source is coupled out into the area of a reflector of a neighboring headlight in order to generate a further light function in the neighboring headlight. For the coupling-in of light as the light source for the optical waveguide element, an additional reflector is disposed in front of the first reflector in the main beam radiation direction that causes light emitted by the light source to be reflected essentially transversely to the main beam radiation direction of the headlight.

However, a disadvantage of this type headlight is that the surface of the additional reflector has to be relatively small in order not to form an undesirable shadowing in the light beam range of the first reflector. The limited space for construction of the additional reflector is, therefore, accompanied by a limited efficiency of the coupling of light into the optical waveguide element. A double function of two neighboring headlights can therefore virtually only be achieved by means of two active light sources.

It is therefore an object of the present invention to improve the known headlights such that, on the one hand, an additional light source is not necessary and that, on the other hand, the efficiency of the coupling of light into the optical waveguide element is increased.

These and other objects and advantages of the invention are achieved with a reflecting element being disposed in front of the light source in a main beam radiation direction in an area of the optical axis of the reflector, wherein a portion of the light of the light source, from a reflection surface of the reflecting element facing away from the main radiation direction, can be focused at a second focal point neighboring a light input surface of an optical waveguide element and therefrom is coupled into the optical waveguide element.

As a result of the reflecting element being disposed in front of the light source in an area of the optical axis, an undesirable shadowing in the edge area of the reflector, and thus in the edge area of the main beam radiation beam is avoided. By placing the reflecting element close to the center of the main radiation beam which is minimal in the reflector area, the reflecting element does not have a disturbing effect and it contributes to a desirable shadowing of unreflected rays of the light source. Thus, as a result of this favorable arrangement of the reflecting element, the forward area of the reflector remains relatively uninfluenced by the reflecting element in generating the main radiation beam, while a central rearward area of the reflector, in connection with the reflecting element, is used for coupling the light into the optical waveguide element. The need for an additional or independent light source for the optical waveguide element is thus avoided. The reflector and thus the installation space of the headlight does not have to be enlarged by the additional function and can be kept relatively flat. The construction of the vehicle headlight can furthermore be implemented relatively easily in volume in a cost-effective manner.

According to a preferred embodiment of the invention, the reflecting element is constructed as a mirror and is inclined with respect to the longitudinal axis in the main beam radiation direction such that light reflected from a first partial area of the reflector onto the mirror is directed to the light input surface of the optical waveguide element. The mirror can be constructed with a planar surface, and the mirror can be coated with a vaporized metal oxide layer in order to reduce the temperature at the optical waveguide element and at the mirror.

The planar mirror has a relatively simple and cost-effective construction and, in cooperation with the central area of the reflector adapted to it, the mirror contributes to an efficient coupling of light of the light source into the optical waveguide element.

According to another preferred embodiment of the invention, an optical waveguide is disposed in front of the reflector in a focal area of its light reflection which is forward of the reflector in the main beam radiation direction. The optical waveguide is constructed as a light output element and is placed, at least in some areas, adjacent to an edge of the reflector. The optical waveguide or the light output element has a light exit surface facing away from the reflector and a light entrance surface facing the reflector. The forward reflector area has a third focal point which coincides with the first focal point at the light source. The light of the light source is focused in this forward reflector area toward the light entrance surface of the light output element in a focal line which is adjacent to the light entrance surface of the optical waveguide. By focusing the light facing away from the light source in a focal line, the light of the light source can very efficiently be coupled into the optical waveguide. As a result, the optical waveguide can be used to generate a daytime driving light wherein the daytime driving light beam is constructed as a hollow main radiation beam.

According to another preferred embodiment of the invention, the reflector has a circular construction when viewed from the main radiation direction, and the optical waveguide is constructed as a light ring of a daytime driving light chamber bounded by the reflector.

According to another preferred embodiment of the invention, the optical waveguide element is connected with a neighboring optical waveguide of a neighboring headlight. The neighboring optical waveguide is constructed as a light output element which, at least in some of its areas, is adjacent to, or disposed in front of, an edge of a reflector of the neighboring headlight.

The neighboring optical waveguide of the neighboring headlight requires no separate light source and can radiate light in the same color as the vehicle headlight having the optical waveguide element. In this case, the neighboring optical waveguide can be constructed as a light ring of a low-beam chamber bounded by the reflector of the neighboring headlight.

According to another preferred embodiment of the invention, the optical waveguide element is fixedly connected with the neighboring optical waveguide. For example, the optical waveguide element can be molded to the neighboring optical waveguide.

The neighboring optical waveguide with the molded-on optical waveguide element can be produced and assembled in a cost-effective manner. Because of its short length, it is less susceptible to breaking. To the extent that the optical waveguide element is molded to the neighboring optical waveguide, such as by injection molding, fewer media junctions are present so that lower losses of light occur. The optical waveguides, on the whole, may have a short construction which also contributes to better luminous power.

The reflectors and optical waveguides may have a circular structure, or may have other type structures, such as a rectangular structure.

Additional details of the invention are contained in the following description and the attached drawings, in which preferred embodiments of the invention are illustrated as examples.

DETAILED DESCRIPTION OF THE DRAWINGS

Figure 1:
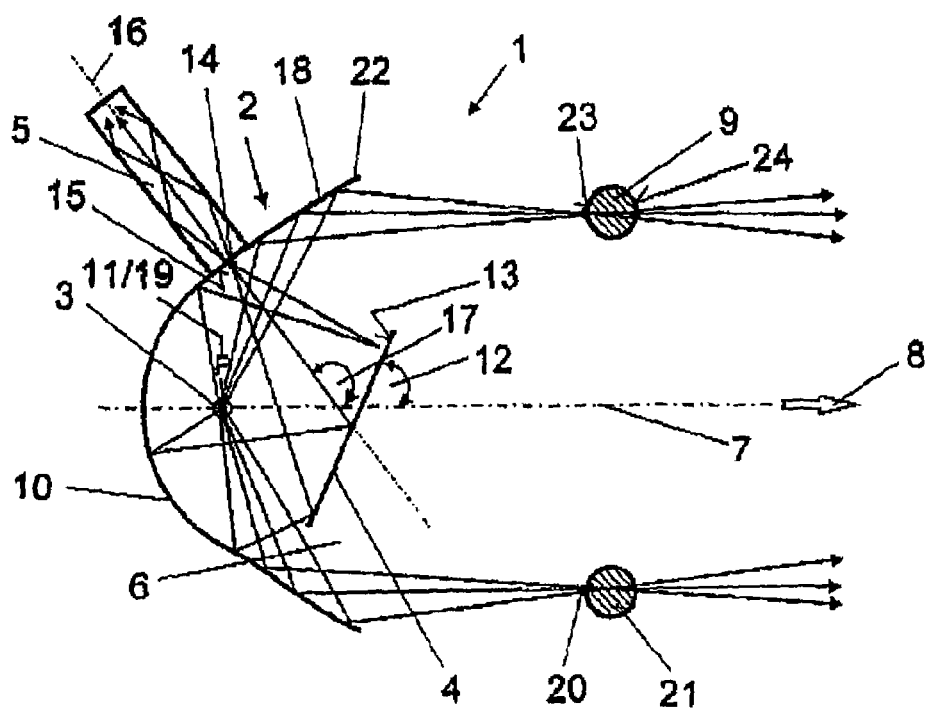
FIG. 1 is a side elevation view of a headlight with a coupling-in of light from a light source into an optical waveguide element.

Referring to FIG. 1, a vehicle headlight 1 has a reflector 2, a light source 3, a reflecting element 4 and an optical waveguide element 5.

The reflector 2 defines a boundary of a daytime driving light chamber 6. Reflector 2 has an optical or longitudinal axis 7 which is situated in a main radiation direction 8. An optical waveguide 9 is disposed in front of the reflector in the main radiation direction 8.

With respect to the main radiation direction 8, reflector 2 has a central first partial area 10 with a first focal point 11 at the site of the light source 3. In the area of the optical axis 7, reflecting element 4 is disposed in front of light source 3 in the main radiation direction 8. Reflecting element 4 forms an angle 12 with optical axis 7 and is inclined with respect to optical axis 7 such that its reflecting surface 13 (facing the first partial area 10) focuses light from the light source 3 as reflected by first partial area 10 of reflector 2 at a second focal point 14 neighboring a light input surface 15 of the optical waveguide element 5. Reflecting element 4 is constructed as a planar mirror. The light focused at the second focal point 14 is coupled by way of the light input surface 15 into optical waveguide element 5 and is transmitted therefrom by total reflection. Optical waveguide element 5 has a longitudinal axis 16 which forms an obtuse angle with the optical axis 7 of reflector 2. Optical waveguide element 5 is situated with its light input surface 15 in the edge area of the first central partial area 10 and thus is neighboring to the adjoining second partial area which forms a surrounding forward reflector area 18.

Forward reflector area 18 has a third focal point 19 at the site of the light source 3, which thus coincides with first focal point 11 and focuses the light of light source 3 along focal lines in the main radiation direction 8 to fourth focal point 20. The optical waveguide 9 is constructed as a light output element 21, and is neighboring to an edge 22 of reflector 2.

Light output element 21 has a light entrance surface 23 that faces opposite to main radiation direction 8, and is neighboring to fourth focal point 20 from which the light of light source 3 is coupled into light output element 21. Opposite to the light entrance surface 23 in the main radiation direction 8, light output element 21 has a light exit surface 24, by which the light of light source 3 is coupled out as a ring-shaped daytime driving light beam.

Figure 2:
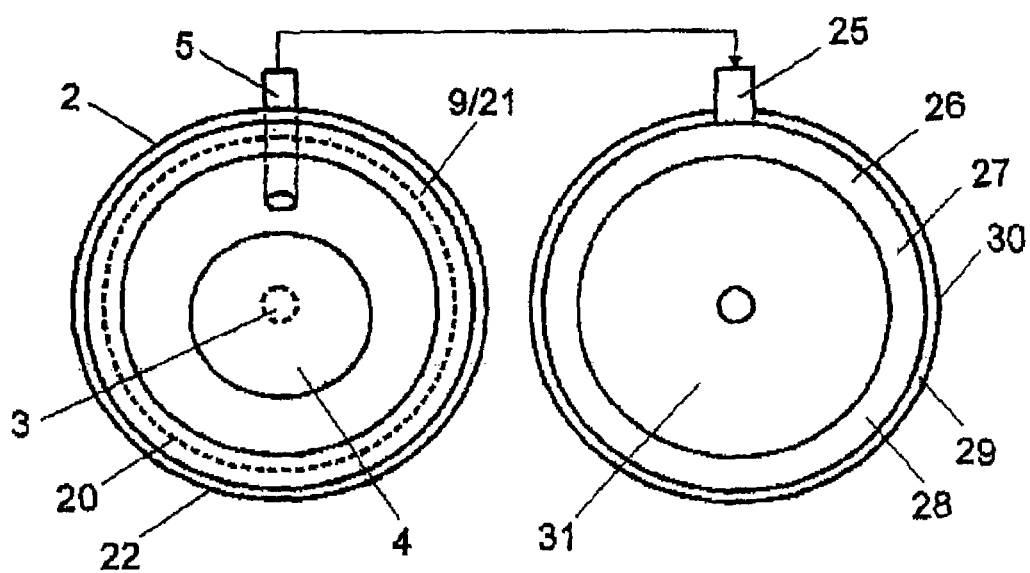
FIG. 2 is a front view of a vehicle headlight with a neighboring second headlight.

Referring now to FIG. 2, optical waveguide element 5 is connected with a light input element 25 of a neighboring optical waveguide 26. Neighboring optical waveguide 26 has a light output surface 27 by which the light coupled into optical waveguide element 5 is coupled out. On its back side situated opposite to light output surface 27, neighboring optical waveguide 26, in a known manner, may have a reflective surface (not shown).

Optical waveguide element 5 is fixedly connected with the neighboring optical waveguide 26 or its light input element 28. However, it is also conceivable to fixedly arrange the optical waveguide element 5 on reflector 2 and to connect it with the light input element 25 by way of an optical waveguide element 28, which can be fitted onto light input element 25 as shown in FIG. 2.

Figure 3:
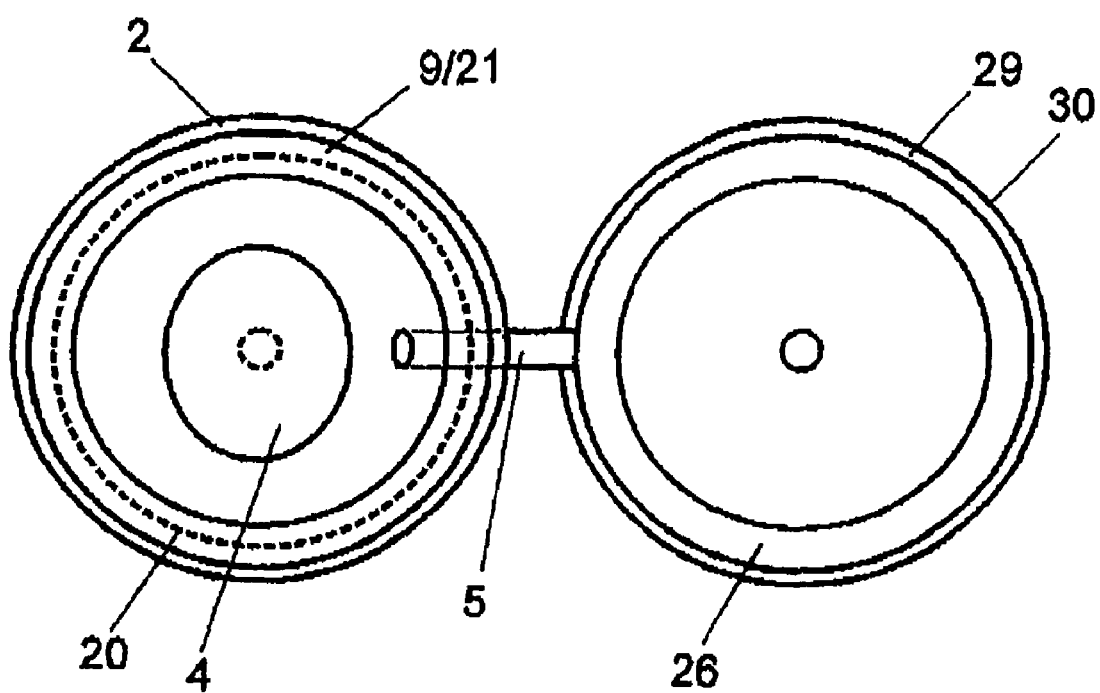
FIG. 3 is a front view of another embodiment of a headlight with a neighboring second headlight.

In FIG. 3, the optical waveguide element 5' is shown molded directly to the neighboring optical waveguide 26'.

Neighboring optical waveguide 26 (FIG. 2), 26' (FIG. 3), is disposed in front of the neighboring reflector 29 and preferably near its reflector edge 30 in a neighboring manner. In this case, the neighboring reflector 29 bounds a low-beam chamber 31 (FIG. 2).

When the daytime driving light is switched on, light from light source 3 is therefore radiated by optical waveguide 9 constructed as a light ring, and by neighboring optical waveguide 26, 26', which is also constructed as a light ring, in connection with the optical waveguide element 5, 5'. A parking light is generated by a dimming of the daytime driving light.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A vehicle headlight comprising:
   a reflector with at least a first focal point at the site of a light source, the reflector defining a boundary of a chamber open in a main radiation direction, a reflecting element disposed in front of the light source in the main radiation direction in an area of an optical axis of the reflector, the reflecting element being arranged at least partially within the chamber, wherein a portion of a light of the light source, from a reflection surface of the reflecting element facing away from the main radiation direction, is focused at a second focal point, on or within the chamber, neighboring a light input surface of an optical waveguide element and is coupled into the optical waveguide element.

2. The vehicle headlight according to claim 1, wherein the reflecting element is constructed as a mirror and is inclined with respect to the optical axis in the main radiation direction, and light reflected from a first partial area of the reflector onto the mirror is directed to the light input surface of the optical waveguide element.

3. The vehicle headlight according to claim 2, wherein the mirror is constructed as a planar mirror.

4. The vehicle headlight according to claim 1, wherein an optical waveguide is disposed in front of the reflector in a forward reflector area in the main radiation direction, said optical waveguide being constructed as a light output element which, at least in areas, is neighboring to an edge of the reflector, and comprises a light exit surface facing away from the reflector and a light entrance surface facing the reflector.

5. The vehicle headlight according to claim 2, wherein an optical waveguide is disposed in front of the reflector in a forward reflector area in the main radiation direction, said optical waveguide being constructed as a light output element which, at least in areas, is neighboring to an edge of the reflector, and comprises a light exit surface facing away from the reflector and a light entrance surface facing the reflector.

6. The vehicle headlight according to claim 3, wherein an optical waveguide is disposed in front of the reflector in a forward reflector area in the main radiation direction, said optical waveguide being constructed as a light output element which, at least in areas, is neighboring to an edge of the reflector, and comprises a light exit surface facing away from the reflector and a light entrance surface facing the reflector.

7. A vehicle headlight comprising:
a reflector with at least a first focal point at the site of a light source,
a reflecting element disposed in front of the light source in a main radiation direction in an area of an optical axis of the reflector,
wherein a portion of a light of the light source, from a reflection surface of the reflecting element facing away from the main radiation direction, is focused at a second focal point neighboring a light input surface of an optical waveguide element and is coupled into the optical waveguide element,
wherein an optical waveguide is disposed in front of the reflector in a forward reflector area in the main radiation direction, said optical waveguide being constructed as a light output element which, at least in areas, is neighboring to an edge of the reflector, and comprises a light exit surface facing away from the reflector and a light entrance surface facing the reflector, and
wherein the forward reflector area comprises a third focal point which coincides with the first focal point at the light source, and the forward reflector area focuses the light of the light source toward the light entrance surface of the light output element in a focal line.

8. A vehicle headlight comprising:
a reflector with at least a first focal point at the site of a light source,
a reflecting element disposed in front of the light source in a main radiation direction in an area of an optical axis of the reflector,
wherein a portion of a light of the light source, from a reflection surface of the reflecting element facing away from the main radiation direction, is focused at a second focal point neighboring a light input surface of an optical waveguide element and is coupled into the optical waveguide element,
wherein an optical waveguide is disposed in front of the reflector in a forward reflector area in the main radiation direction, said optical waveguide being constructed as a light output element which, at least in areas, is neighboring to an edge of the reflector, and comprises a light exit surface facing away from the reflector and a light entrance surface facing the reflector, and
wherein the optical waveguide is constructed as a light ring of a daytime driving light chamber bounded by the reflector.

9. The vehicle headlight according to claim 7, wherein the optical waveguide is constructed as a light ring of a daytime driving light chamber bounded by the reflector.

10. A vehicle headlight comprising:
a reflector with at least a first focal point at the site of a light source,
a reflecting element disposed in front of the light source in a main radiation direction in an area of an optical axis of the reflector,
wherein a portion of a light of the light source, from a reflection surface of the reflecting element facing away from the main radiation direction, is focused at a second focal point neighboring a light input surface of an optical waveguide element and is coupled into the optical waveguide element, and
wherein the optical waveguide element is connected with a neighboring optical waveguide of a neighboring headlight, and the neighboring optical waveguide comprises a light output element which, at least in areas, is neighboring to an edge of a reflector of the neighboring headlight.

11. The vehicle headlight according to claim 10, wherein the neighboring optical waveguide comprises a light ring of a low-beam driving light chamber bounded by the reflector of the neighboring headlight.

12. The vehicle headlight according to claim 10, wherein the optical waveguide element is fixedly connected with the neighboring optical waveguide.

13. The vehicle headlight according to claim 11, wherein the optical waveguide element is fixedly connected with the neighboring optical waveguide.

14. The vehicle headlight according to one of claim 10, wherein the optical waveguide is molded to the neighboring optical waveguide.

15. A motor vehicle comprising an apparatus for illuminating two adjacent optical waveguides from a single light source comprising:
a light source for radiating a light,
a reflector having a main optical axis and comprising a partial central area and a forward reflector area and configured to reflect at least a part of said light from said partial central area to an inclined reflector mirror relative to said main optical axis, and to reflect at least a part of said light from said forward reflector area to an optical waveguide disposed forward of the reflector in the main light beam direction,
wherein the reflector mirror is disposed in a chamber area in front of said light source and in front of said reflector in a main radiation direction with the chamber area being bounded by an inside surface of the reflector, an optical waveguide element coupled to a surface of said reflector for receiving mirror reflected light from said inclined reflector mirror and coupling said mirror reflected light to a neighboring optical waveguide associated with a neighboring headlight.

16. A method for illuminating two adjacent optical waveguides from a single light source comprising the acts of:

placing a light source for radiating a light in front of, and on an optical axis of, a reflector in a main light beam direction;

configuring said reflector to comprise a partial central area and a forward reflector area to reflect at least a part of said light from said partial central area to an inclined reflector mirror relative to said main optical axis, and to reflect at least a part of said light from said forward reflector area to a first optical waveguide disposed forward and close to an edge of the reflector in the main light beam direction;

placing a reflector mirror on said optical axis in front of said light source and said reflector in the main light beam direction, wherein the reflector mirror is disposed in a chamber area in front of said light source and in front of said reflector in a main radiation direction with the chamber area being bounded by an inside surface of the reflector; and coupling an optical waveguide element to a surface of said reflector extending outward therefrom in a direction opposite to said main light beam direction, said optical waveguide element being adapted for receiving mirror reflected light from said inclined reflector mirror and coupling said mirror reflected light to a second optical waveguide.

* * * * *